United States Patent
Paulino

(10) Patent No.: US 8,474,239 B1
(45) Date of Patent: *Jul. 2, 2013

(54) INDUSTRIAL GAS TURBINE ENGINE

(75) Inventor: Joseph R Paulino, West Palm Beach, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 221 days.

This patent is subject to a terminal disclaimer.

(21) Appl. No.: 13/109,094

(22) Filed: May 17, 2011

Related U.S. Application Data

(63) Continuation of application No. 12/784,027, filed on May 20, 2010, now Pat. No. 7,980,052.

(51) Int. Cl.
*F02C 6/00* (2006.01)
*F02G 1/00* (2006.01)
*F02G 3/00* (2006.01)

(52) U.S. Cl.
USPC .............. 60/39.15; 60/784; 60/785; 60/806

(58) Field of Classification Search
USPC ................. 60/784, 785, 39.15, 806
See application file for complete search history.

(56) References Cited

U.S. PATENT DOCUMENTS

| 6,199,366 B1 * | 3/2001 | Murata et al. | 60/785 |
| 7,581,401 B2 * | 9/2009 | West et al. | 60/772 |

* cited by examiner

*Primary Examiner* — William H Rodriguez
*Assistant Examiner* — Craig Kim
(74) *Attorney, Agent, or Firm* — John Ryznic

(57) ABSTRACT

An industrial gas turbine engine capable of operating at higher temperatures than air cooled nickel based alloy airfoils in the turbine. The engine burns stoichiometric or rich to produce a hot gas stream that is mostly without oxygen, and the turbine airfoils are made from a high temperature resistant material such as a refractory material that also has poor oxidation resistance. A second small gas turbine engine is used to compress nitrogen gas that is used to pass through the turbine airfoils for cooling where the film cooling nitrogen gas is injected into the hot gas stream but without igniting the fuel rich gas stream.

10 Claims, 2 Drawing Sheets

INDUSTRIAL GAS TURBINE ENGINE

CROSS-REFERENCE TO RELATED APPLICATIONS

This application is a CONTINUATION of U.S. patent application Ser. No. 12/784,027 filed on May 20, 2010 and entitled INDUSTRIAL GAS TURBINE ENGINE.

GOVERNMENT LICENSE RIGHTS

None.

BACKGROUND OF THE INVENTION

1. Field of the Invention

The present invention relates generally to gas turbine engine, and more specifically for an air cooled turbine blade.

2. Description of the Related Art Including Information Disclosed Under 37 CFR 1.97 and 1.98

In a gas turbine engine, such as a large frame heavy-duty industrial gas turbine (IGT) engine, a hot gas stream generated in a combustor is passed through a turbine to produce mechanical work. The turbine includes one or more rows or stages of stator vanes and rotor blades that react with the hot gas stream in a progressively decreasing temperature. The efficiency of the turbine—and therefore the engine—can be increased by passing a higher temperature gas stream into the turbine. However, the turbine inlet temperature is limited to the material properties of the turbine, especially the first stage vanes and blades, and an amount of cooling capability for these first stage airfoils. Typically only the first and second stages of blades and vanes are cooled while the later stage or stages are uncooled because the gas stream temperature has decreased below the maximum acceptable temperature for these airfoils. As turbine inlet temperatures rise, even these later stage airfoils will require cooling, if not to prevent melting of the material, but also to prevent thermal fatigue or creep issues.

A prior art industrial gas turbine engine includes stator vanes and rotor blades made from high strength and high temperature resistant materials in order to withstand the high temperatures and, in the case of the turbine rotor blades, high centrifugal loads. A typical material is a nickel super alloy that can be formed by investment or lost wax casting, or for blades that will have stronger tensile stress capability from a directionally solidified or single crystal material. However, to allow for operating temperatures above these materials melting temperature, complex airfoil cooling is required. Recent industrial gas turbine engines operate with a turbine inlet temperature of around 2,600 degrees F. (1427 degrees C.). Airfoil cooling can include internal convection and impingement cooling and external film cooling to draw heat away from the airfoil and to provide a protective blanket or layer of cooling air to the external airfoil surface.

The pressurized cooling air required for cooling these airfoils typically is bled off from the compressor. In an engine where several blade rows must be cooled, the amount of cooling air flow can be as high as 25-30% of the entire engine air flow. The cooling air from the compressor is not used to produce any work in the engine and therefore the work by the compressor that goes into compressing the cooling air is wasted.

Nickel based alloys have been used for turbine blades and vanes because of the stronger material properties and high temperature resistance. Several metallic alloys exist that have great strength and creep properties at very high temperatures (greater than 4,000 degrees F.) when compared to nickel based alloys. However, these materials have poor oxidation resistance and therefore have not been used in turbines. When exposed to the combustion gas flow that typically includes unburned oxygen, these materials quickly oxidize away. These materials include refractory metals such as Niobium (Columbium), Molybdenum, Tungsten, Rhenium and Tantalum, and oxidation dispersed strengthened (ODS) alloys. Protective coatings have been used to protect the base alloy but with limited success.

BRIEF SUMMARY OF THE INVENTION

A gas turbine engine with a turbine having stator vanes and rotor blades made from an extremely high temperature resistant material that has great strength and creep capabilities, but poor oxidation resistance, and a combustor that operates at stoichiometric or rich fuel to air ratios such that most of the oxygen is reacted with the resulting hot gas stream having a reduced oxygen content less than standard or state of the art lean combustors. With this low oxygen content within the turbine inlet hot gas stream, the turbine can use refractory materials or ODS or other high temperature resistant and oxidation limited materials so that a much higher turbine inlet temperature can be used, significantly increasing the turbine efficiency and the engine efficiency over the prior art engines. The turbine exhaust with the rich fuel can then be passed through a excess fuel recovery system to remove as much of the unburned fuel as possible before discharging the turbine exhaust to atmosphere.

Because of the use of these high temperature resistant materials that have oxidation limiting characteristics, the airfoils do not require cooling, and therefore all of the compressed air from the compressor can be used in the combustor, also allowing for an increase in the engine efficiency. In another embodiment, oxygen and nitrogen are both separated from air with the nitrogen compressed in a smaller gas turbine engine and used to provide internal cooling of the turbine airfoils, since nitrogen will not react with the fuel rich hot gas stream passing through the turbine. The separated oxygen is delivered to the compressor of the main gas turbine engine to be used in the combustor to produce the fuel rich hot gas stream.

In another embodiment, a second smaller gas turbine engine is used in which the separated oxygen is compressed and then passed into a second main engine combustor to burn the fuel rich hot gas stream exiting from the first turbine and produce a second hot gas stream that is then passed through a second main turbine to drive the main electric generator. The second main engine combustor is a lean inter-turbine burner and the exhaust from the second main turbine can be discharged to atmosphere or passed through a recuperator or regenerator for a combined cycle power plant.

DETAILED DESCRIPTION OF THE INVENTION

An industrial gas turbine engine of the present invention makes use of high temperature resistant materials in the turbine (higher resistance than the nickel based alloys) but with oxidation limiting characteristics so that a much higher turbine inlet temperature can be used, and where the hot gas stream is a fuel rich combustion such that very little amounts of oxygen are left in the hot gas stream that is passed through the turbine so that these high temperature resistant but oxidation limited alloys can be used.

Figure 1:
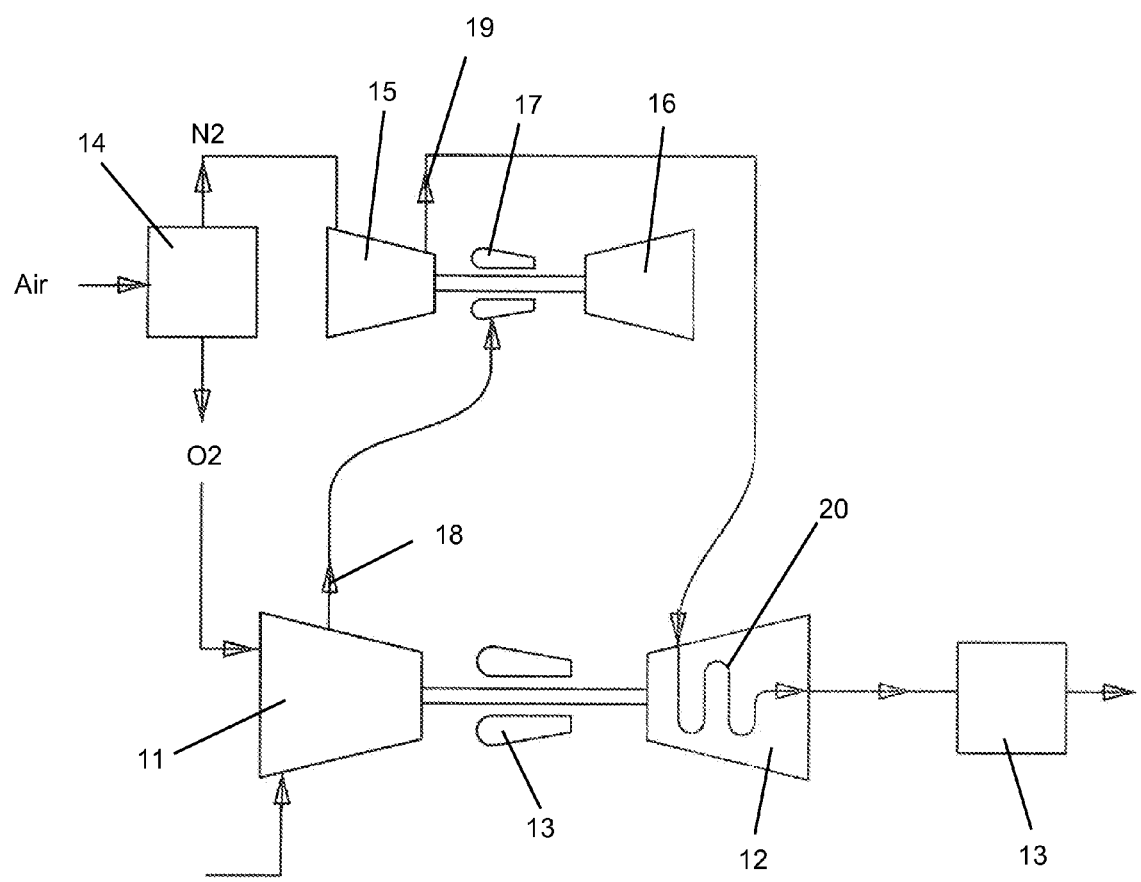
FIG. 1 shows a gas turbine engine with a rich burning combustor of the present invention.

FIG. 1 shows a first embodiment of the gas turbine engine for electric power production and includes a main gas turbine engine that drives an electric generator (not shown) and includes a main compressor 11, a main turbine 12 and a main combustor 13 which can be a can annular combustor or any other combustor assembly used to produce a hot gas stream for the turbine. In this embodiment, the turbine airfoils (rotor blades and stator vanes) that require cooling can be cooled with a cooling fluid. In another embodiment, because of the use of these high temperature resistant materials no cooling will be required. The main gas turbine engine is operated to burn fuel in a rich state so that as much of the oxygen used in combustion will be burned and therefore not present in the hot gas stream that is passed through the turbine. To remove the fuel rich turbine exhaust gas, an excess fuel recovery system 13 is used, such as a catalytic converter or a burner. The unburned fuel treated exhaust can then pass into a recuperator or regenerator as part of a combined cycle power plant, or the exhaust can be discharged directly to atmosphere.

As seen in FIG. 1, a smaller gas turbine engine is used to supply compressed nitrogen gas to the main turbine 12 to be used as the cooling fluid for the turbine hardware (rotor blades, stator vanes, blade outer air seals, etc.) that require cooling. The smaller gas turbine engine includes a small compressor 15, a small turbine 16 and a small combustor 17, where the term small is in reference to the larger gas turbine engine. The size of both gas turbine engines will depend upon the amount of electric power to be produced and the amount of compressed nitrogen cooling fluid that is needed in the larger turbine 12.

A separator 14 is used to separate both oxygen and nitrogen from air. The oxygen gas is supplied to the main compressor 11 of the main engine to be compressed and delivered to the main combustor 13. Some examples for the separator 14 can be a cryogenic or membrane separator. The nitrogen gas is delivered to the small compressor 15 of the small engine and compressed to a pressure usable for cooling the airfoils of the main turbine 12. The compressed nitrogen gas 19 is passed through an internal cooling circuit 20 within the stator vanes, rotor blades, and blade outer air seals of the main turbine to provide cooling. The cooling circuit 20 can include convection cooling, impingement cooling and even film cooling in which some of all of the nitrogen cooling gas is discharged into the hot gas stream. Because the cooling fluid is nitrogen and not air (which contains oxygen), the cooling fluid does not react with the unburned fuel in the hot gas stream and combust within the turbine.

To power the smaller engine, compressed air 18 from the main compressor 11 is bled off and delivered to the small combustor 17 to be burned with a fuel and produce a hot gas stream that is then passed through the smaller turbine 16 that then drives the smaller compressor 15 used to compress the nitrogen gas.

Because the hot gas stream passing through the turbine has a very low amount of oxygen the blades and vanes of the main turbine 12 can be made from refractory materials (such as Niobium, Molybdenum, Tungsten, Rhenium, Tantalum) or ODS (Oxidation Dispersed Strengthened) alloys or any other turbine alloy limited by oxidation resistance. With these materials used for the hot parts within the turbine along with the compressed nitrogen gas cooling of these hot parts, turbine inlet temperatures of around 4,000 degrees F. can be used in which an overall engine efficiency increase over the prior art engines of 6% or 8% is possible. To provide further protection to these hot parts of the turbine, an oxidation protective coating such as aluminides, silicides, or ceramic barrier coatings can be used that will protect the parts from any oxygen that is left in the hot gas stream.

One further embodiment of the gas turbine engine of FIG. 1 is to do away with the smaller gas turbine engine and the cooling gas for the main turbine by not using any cooling gas for the turbine at all. Because of the high temperature resistance natural of these materials along with the rich burning fuel in the combustor that produces very little oxygen in the hot gas stream entering the turbine, the turbine inlet temperature can be lower so that no cooling of the turbine hot parts is required. With no compressed cooling air needed, all of the compressed air from the main compressor 11 can be used in the combustor 13 to produce the hot gas stream. Since no work from the compressor is wasted to compress air not used in the combustor, the efficiency of the engine can be increased over that of the prior art nickel based alloy engines that do require compressed cooling air for the turbine hot parts.

Figure 2:
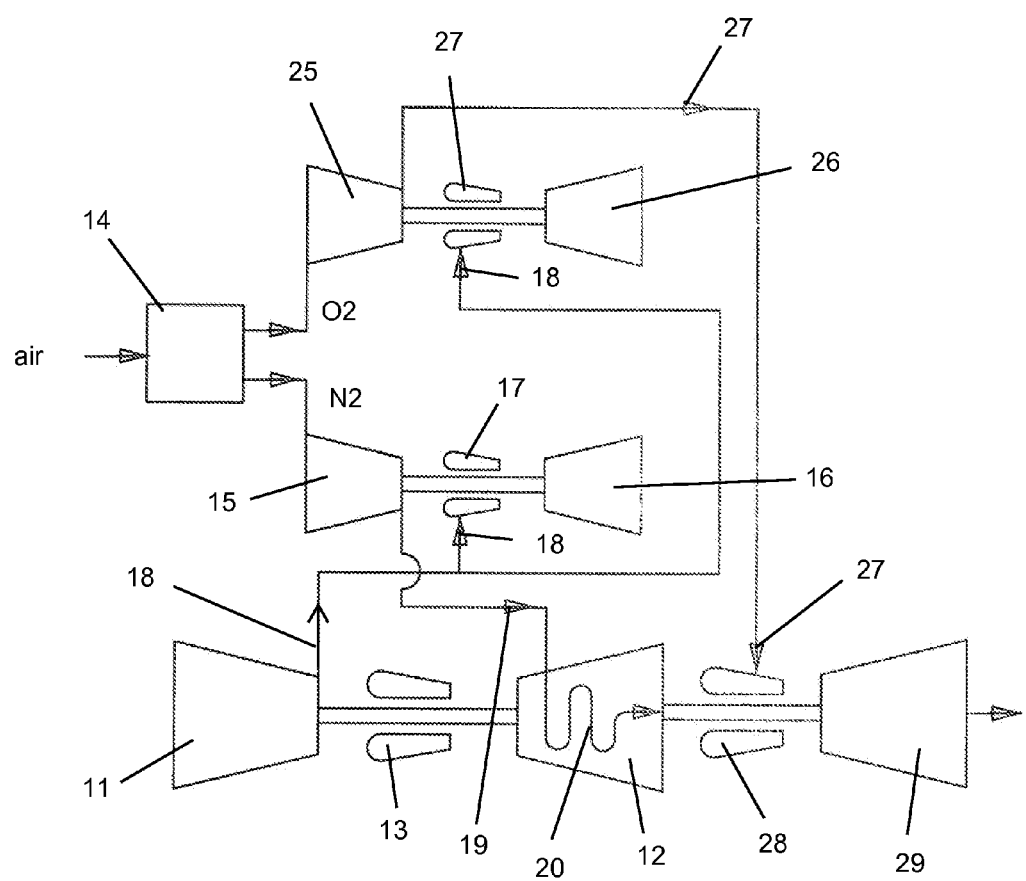
FIG. 2 shows a second embodiment of the gas turbine engine with a rich burning combustor followed by a lean inter-turbine combustor of the present invention.

FIG. 2 shows another embodiment of the rich burning gas turbine engine of the present invention. In the FIG. 2 embodiment, two smaller gas turbine engines are used and a second large combustor 28 and second large turbine 29 is used to burn the rich fuel containing exhaust of the first main turbine to produce a second hot gas stream that is passed through the second main turbine. The first smaller gas turbine engine includes the small compressor 15 that compresses the nitrogen gas 19 from the separator 14 that is used to provide cooling gas for the first main turbine 12 through the airfoil internal cooling circuit 20 just like in the FIG. 1 embodiment. Compressed air from the first main compressor is bled off to provide compressed air 18 to the first small combustor 18 and the second small combustor 27. Both large turbines 12 and 29 can be connected to a common rotor shaft to drive one generator, or the second turbine 29 can be connected to a separate rotor shaft to drive a separate generator from the first large turbine 12.

The second small gas turbine engine includes a second compressor 25, a second small turbine 26 and a second small combustor 27. The second small compressor 25 is used to compress the oxygen gas from the separator 14 that is then passed into the second main combustor to be burned with the fuel rich exhaust from the first main turbine 12. The exhaust from the second main turbine 29 can then pass into a recuperator or regenerator as part of a combined cycle power plant, or the exhaust can be discharged directly to atmosphere. As in the description of the FIG. 1 embodiment, the FIG. 2 embodiment can be operated without cooling of the first main turbine hot parts so that the main compressor does not need to produce work on compressing air that is not used in the main combustor. This will improve the engine efficiency by not wasting compressed air.

A protective coating can be used on the turbine hot parts to further provide protection against any remaining oxygen that is present in the hot gas stream. The protective coating for these materials can be diffused aluminides, silicides, or other barrier coatings that works well with these materials. With these materials and the low oxygen gas stream, 573 degrees F. (300 degrees C.) higher turbine inlet temperature can be achieved. Or, the prior art turbine inlet temperature can be maintained while eliminating the turbine hot parts cooling so that the compressor can be used only to compress the air required for the combustor.

The rich combustor can reduce oxygen levels below 100 ppm. The desired turbine inlet temperature can be achieved by a rich equivalence ratio, while maintaining equivalence ratio of less than around 1.5 to minimize soot formation. Oxygen sensors can be used within the engine to ensure the system functions properly. Instead of nitrogen, an inert gas can be used to cool the main turbine hot parts. The system might also require purging with nitrogen gas or an inert gas prior to startup and after shutdown.

The invention can also be applied to an internal combustion (Diesel, spark ignition, or gasoline direct injection) turbocharged engine which burns stoichiometric or fuel rich to create a low oxygen exhaust gas stream. The exhaust gas stream expands through a turbine comprised of stator vanes and rotor blades made from refractory metals, ODS alloys, or other oxidation limited materials. Any unburned hydrocarbons are then reacted in a catalytic converter and then can be discharged directly into the atmosphere.

I claim the following:

1. An industrial gas turbine engine comprising:
   a main gas turbine engine connected to an electric generator to produce electric power, the main gas turbine engine including a main compressor and a main combustor and a main turbine;
   a smaller gas turbine engine compressing a cooling fluid for the turbine in the main gas turbine engine, the smaller gas turbine engine including a small compressor and a small combustor and a small turbine;
   an air separator to produce an inert gas that is not reactive with oxygen;
   a low pressure nitrogen line to connect the nitrogen gas from the air separator to an inlet of the small compressor;
   a high pressure nitrogen line to connect an outlet of the small compressor to a cooling circuit within hot parts of the main turbine;
   a compressed air line to connect the main compressor to the small combustor to supply compressed air for combustion; and,
   the main combustor operating in a stoichiometric or fuel rich combustion to produce a hot gas stream for the main turbine that is low in oxygen.

2. The industrial gas turbine engine of claim 1, and further comprising:
   the small compressor is used only to compress the nitrogen for the main turbine cooling.

3. The industrial gas turbine engine of claim 1, and further comprising:
   the main turbine includes airfoils with internal cooling circuits and film cooling holes that discharge the compressed nitrogen gas into the hot gas stream.

4. The industrial gas turbine engine of claim 3, and further comprising:
   a second main combustor and a second main turbine rotatably connected to the main gas turbine engine, the second main combustor receiving a fuel rich exhaust from the first main turbine;
   a second small gas turbine engine with a second small compressor and a second small combustor and a second small turbine;
   the air separator also produces an oxygen gas;
   a low pressure oxygen line to connect oxygen gas from the air separator to an inlet of the second small compressor; and,
   an outlet of the second small compressor is connected to the second main combustor to supply compressed oxygen to the second main combustor to produce a second hot gas stream with the fuel rich exhaust from the main gas turbine engine.

5. The industrial gas turbine engine of claim 4, and further comprising:
   the second small compressor is used only to compress the oxygen for the second main combustor; and,
   the compressed air line also connects the main compressor to the second small combustor to supply compressed air for combustion.

6. The industrial gas turbine engine of claim 1, and further comprising:
   the air separator also produces an oxygen gas; and,
   a low pressure oxygen line to connect the oxygen gas from the separator to an inlet of the main compressor.

7. The industrial gas turbine engine of claim 1, and further comprising:
   the hot parts in the main turbine are first stage stator vanes and first stage rotor blades.

8. The industrial gas turbine engine of claim 7, and further comprising:
   the hot parts in the main turbine are coated with an oxidation resistant coating.

9. The industrial gas turbine engine of claim 1, and further comprising:
   the main turbine including hot parts formed from a high temperature resistant material but poor oxidation resistance selected from a group of Niobium (Columbium), Molybdenum, Tungsten, Rhenium and Tantalum, and oxidation dispersed strengthened (ODS) alloys.

10. The industrial gas turbine engine of claim 1, and further comprising:
    the inert gas is nitrogen.

* * * * *